US006650889B1

(12) United States Patent
Evans et al.

(10) Patent No.: US 6,650,889 B1
(45) Date of Patent: Nov. 18, 2003

(54) MOBILE HANDSET WITH BROWSER APPLICATION TO BE USED TO RECOGNIZE TEXTUAL PRESENTATION

(75) Inventors: Michael Paul Evans, Chudleigh (GB); Steven Marcus Furnell, Liskeard (GB); Andrew David Phippen, Bodmav (GB); Paul Laurence Reynolds, Wells (GB); John Hammac, Northants (GB); John Kelliher, London (GB)

(73) Assignee: Orange Personal Communications Services Ltd., Bristol (GB)

( * ) Notice: Subject to any disclaimer, the term of this patent is extended or adjusted under 35 U.S.C. 154(b) by 0 days.

(21) Appl. No.: 09/463,475

(22) PCT Filed: Jul. 22, 1998

(86) PCT No.: PCT/GB98/02177

§ 371 (c)(1), (2), (4) Date: Jul. 27, 2000

(87) PCT Pub. No.: WO99/05613

PCT Pub. Date: Feb. 4, 1999

(30) Foreign Application Priority Data

Jul. 22, 1997 (GB) .............................................. 9715516

(51) Int. Cl.[7] .......................... H04M 11/10; H04M 3/00
(52) U.S. Cl. ..................... 455/412; 455/414; 455/418; 709/219
(58) Field of Search ................................. 455/403, 412, 455/414, 418, 419, 420, 550, 563, 566, 569, 575, 90; 709/219, 217, 328, 392; 345/473, 474, 654, 653, 667

(56) References Cited

U.S. PATENT DOCUMENTS 5,426,460 A * 6/1995 Erving et al. ............ 348/14.02

| | | | |
|---|---|---|---|
| 5,982,853 A | * | 11/1999 | Liebermann ................. 379/52 |
| 6,181,351 B1 | * | 1/2001 | Merrill et al. ............... 345/473 |
| 6,449,595 B1 | * | 9/2002 | Arslan et al. ................ 704/235 |
| 6,476,815 B1 | * | 11/2002 | Ando ........................... 345/473 |

FOREIGN PATENT DOCUMENTS

| EP | 0 753 835 | | 1/1997 | ........... G06T/15/00 |
|---|---|---|---|---|
| JP | 2002215180 | * | 7/2002 | ........... G10L/15/00 |

OTHER PUBLICATIONS

*Die Entwicklung des Internet*, www.musikwissenschaft. uni.ma, not dated.

*Real–time extensions for HTML on interactive digital television*, Djupsjöbacka, et al., www.w3.org, Apr. 9, 1999.

* cited by examiner

Primary Examiner—Nguyen T. Vo
Assistant Examiner—Edan Orgad
(74) Attorney, Agent, or Firm—Knobbe, Martens, Olson & Bear, LLP

(57) ABSTRACT

A mobile handset for use in a mobile communications system includes a user interface, a radio communications front end, a radio transceiving antenna, and a browser application to interpret a multimedia document received from a remote server. The browser application recognizes textual presentation markup tags in the document and presents text to a user in accordance with the markup tags. The browser application recognizes a standard set of document-independent local library file markup tags in the document, and stores a standard set of non-textual local library files corresponding to the local library file markup tags. The browser application further presents content provided by one of the local library files via the user interface in response to the recognition of one of the local library file markup tags in the document.

27 Claims, 6 Drawing Sheets

THEME 1

NAVIGATION

| GRAPHICS TAG | IMAGE |
|---|---|
| HOME |  |
| BACK | |
| NEXT | |
| ARROW 1 |  |
| ARROW 2 |  |
| SEARCH |  |
| HELP | |
| LINKS | (UNDEFINED) |
| FEEDBACK | " " " |

DESIGN

| GRAPHICS TAG | IMAGE |
|---|---|
| CORNER |  |
| LINE 1 |  |
| LINE 2 | |
| LINE 3 | |
| LINE 4 | |
| SEPERATOR 1 |  |
| SEPERATOR 2 |  |
| BULLET 1 |  |
| BULLET 2 |  |

USER

| GRAPHICS TAG | IMAGE |
|---|---|
| USER 1 |  |

USER (CONT.)

| GRAPHICS TAG | IMAGE |
|---|---|
| USER 2 |  |
| USER 3 |  |
| USER 4 |  |
| USER 5 |  |
| USER 6 |  |
| USER 7 | (UNDEFINED) |
| USER 8 | " " " |
| USER 9 | " " " |
| USER 10 | " " " |

THEME 2

| GRAPHICS TAG | NAVIGATION IMAGE |
|---|---|
| HOME | |
| BACK | |
| NEXT | |
| ARROW 1 | |
| ARROW 2 | |
| SEARCH | |
| HELP | |
| LINKS | |
| FEEDBACK | |

| GRAPHICS TAG | DESIGN IMAGE |
|---|---|
| CORNER | |
| LINE 1 | |
| LINE 2 | |
| LINE 3 | |
| LINE 4 | |
| SEPARATOR 1 | |
| SEPARATOR 2 | |
| BULLET 1 | |
| BULLET 2 | |

FIG. 4a

| GRAPHICS TAG | USER IMAGE |
|---|---|
| USER 1 | (UNDEFINED) |
| USER 2 | " " " |
| USER 3 | " " " |
| USER 4 | " " " |
| USER 5 | " " " |
| USER 6 | " " " |
| USER 7 | " " " |
| USER 8 | " " " |
| USER 9 | " " " |
| USER 10 | " " " |

MOBILE HANDSET WITH BROWSER APPLICATION TO BE USED TO RECOGNIZE TEXTUAL PRESENTATION

FIELD OF THE INVENTION

This invention relates to data communications, and in particular to the communication of multimedia documents from multimedia servers to multimedia clients.

BACKGROUND OF THE INVENTION

The Internet currently provides users with a number of different services. One of such services is the WorldWide Web, or "the Web", which has now become relatively well-known and well-used by fixed terminal subscribers.

To access the Web, a user installs a "browser" application on a terminal, which acts as a client interfacing with a network of distributed Web servers via the Internet.

In order to access a page on the Web, a user specifies a universal resource locator (URL), and transmits a pace request via a data link to the Internet. In the Internet, the request is routed to the appropriate Web server as identified in the URL. In return, the Web server transmits the pages back to the requesting browser. The communications protocol used within the Internet is TC/IP during this dialogue.

Web pages are currently formatted using the HyperText markup language (HTML). A Web browser, on receipt of a HTML document, interprets the HTML commands in order to format the text correctly. HyperText links may be included in the document which, when presented to the user, may be selected in order to request a further Web page (a HTML link references a further URL with which the browser retrieves the further page). Web pages currently contain not only text and hyperlinks, but also image, audio and/or video files (hence, Web pages are referred to as "multimedia" documents).

Although the textual data in the Web page is generally relatively data-compact, it is recognized that graphics files, audio files, and in particular video files, contain relatively large amounts of data which can reduce related download of Web pages considerably. As a result, the downloading of "true" multimedia documents including graphics, audio and/or video files can be cumbersome, in particular where the data link used into the Internet is of a type which is of a relatively low data rate.

The speed of download of multimedia Web pages is particularly problematic in the case of mobile data links such as a cellular radio data link, in which the radio data transfer is constrained by the relatively low bandwidth of the radio interface link.

Therefore, although it is currently possible to access the Web at a mobile communications terminal, the option is currently not widely taken advantage of and, when taking advantage of, the data transferred is generally limited to textual data to achieve reasonable download speeds.

Methods are known whereby the amount of data transfer involved in accessing the Web are reduced. In particular, many browsers support a caching facility whereby a Web page, once downloaded, is temporarily stored locally on the client terminal. When the Web page is next requested, the browser recognizes, by the URL in the request corresponding with the URL of the cached document, that the document is currently held locally, and retrieves the locally-held page in preference to re-downloading the page from the Web. The browser may transmit an update check to the Web server in question in order to confirm that the locally-stored Web page remains valid, and if not, downloads the updated Web page.

Caching may be performed on a session-by-session basis, or may be performed such that a cached Web page remains stored between sessions. However, a browser maintains only a limited non-volatile cache of Web pages, and newly-cached Web pages are stored in preference to previously-stored Web pages (which are then deleted) when the cache becomes full.

SUMMARY OF THE INVENTION

In accordance with one aspect of the present invention there is provided a multimedia client terminal, said terminal comprising:

a browser for interpreting a multimedia document received from a remote server, said interpreting means comprising:

means for recognizing textual presentation markup tags in said document and presenting text to a user in accordance with said markup tags;

means for recognizing a standard set of document-independent local library file markup tags in said document;

means for storing a set of non-textual local library files corresponding to said local library tags; and means for presenting the contents of one of said local library files to a user in response to the recognition of one of said local library file tags in said multimedia document.

Rather than needing to download non-textual files accompanying the text of a document, the client terminal is able to receive one or more of a known set of document-independentand data-efficient markup tags and access locally-stored files which correspond to the tags in the downloaded document.

The arrangement of the present invention is to be contrasted with the arrangement in which the client terminal holds a non-volatile cache (although, such a cache may be used in combination with the present invention), in that caching mechanisms do not utilize document-independent local library markup tags. Instead, a document is cached by selection of a URL, and it is unlikely that, when a new multimedia document is downloaded, any parts of the document will already be held locally.

The use of a non-volatile cache is non-systematic, and does not allow a server content developer to design multimedia documents specifically for low data-rate communication links, which is possible with the present invention.

In addition, a non-volatile cache arrangement does not allow a user of a low data-rate receiving terminal to be confident that a new multimedia document can be downloaded at an acceptable speed, which is possible with the present invention.

By defining a standard set of document-independent local library file tags, the present invention allows a server content developer to include one or more of such tags within a document to be placed on a server in the knowledge that a user, provided with a client application for recognizing the predefined set of local library tags and for retrieving appropriate locally-stored files, will be able to download the document relatively quickly and receive each of the intended multimedia parts as intended.

The present invention is of particular utility in relation to mobile communications terminals.

Further aspects of the invention are set out in the appended claims.

Further features of embodiments of the invention are as follows:

1. The system employs tags to locally stored graphical images, drawing primitives, pre-drawn images, image manipulators, audio and video files.
2. A first set of tags provides basic two dimensional drawing functionality, enabling the creation of a range of simple but effective composite images by means ofcombinations of drawings primitives.
3. The client functionality supports a standard predefined range of pre-drawn images that can add further graphical content to a page, over and above that achieved using the drawing primitives. This enables an image to be retrieved from the local repository to be displayed at the specified co-ordinates. A scaling factor may be specified to dynamically resize the image and a hyperlirik can be optionally provided.
4. The client functionality supports the manipulation of on-screen bitmap images.
5. A second set of tags provides basic audio playback capability. The system employs tags to stored speech files as well as the ability to interpret "talking Web pages" through text to speech translation software.
6. The client functionality supports a standard predefined range of audio files enabling a file to be retrieved from the local repository, and spoken by a speech agent at the client.
7. The speech agent supports default vocal and facial styles in order to allow different genders, accents and languages into the playback. Different facial appearances may be selected for the agent. The combination of attributes may be used to create agents with different personalities.
8. A third set of tags provides basic video clip playback capability. The system employs tags to stored video files.
9. The client functionality supports a standard predefined range of video files enabling a file to be retrieved from the local repository and replayed at the client.
10. In one embodiment, tags implementing the new functionality are embedded into Web pages, which may also contain HTML, and content handlers filter out the tags implementing the new functionality before resolving them.
11. In another embodiment, references to files implementing the new functionality are embedded into Web pages, which may also contain HTML, as markups (e.g. for graphics resources <imgsrc="images/text.hgml">; for audio resources <spesrc="audio/test.hsml>; and for video resources <vidsrc="video/test.hvml">).
12. In a further embodiment, pages implementing the new functionality are a separate resource, which may be hyperlinked in the corresponding Web pages containing HTML (e.g. hnp://www.test.com/text.hgml).
13. The drawing functionality provided by tags to graphics primitives supports Web page navigation by means of hyperlinks.

BRIEF DESCRIPTION OF THE DRAWINGS

Embodiments of the invention will now be described, by way of example only, with reference to the accompanying drawings, wherein:

FIG. 4 illustrates an alternative set of graphics elements to be used with the predefined set of graphics tags illustrated in FIG. 3.

DETAILED DESCRIPTION OF CERTAIN EMBODIMENTS OF THE INVENTION

Figure 1:
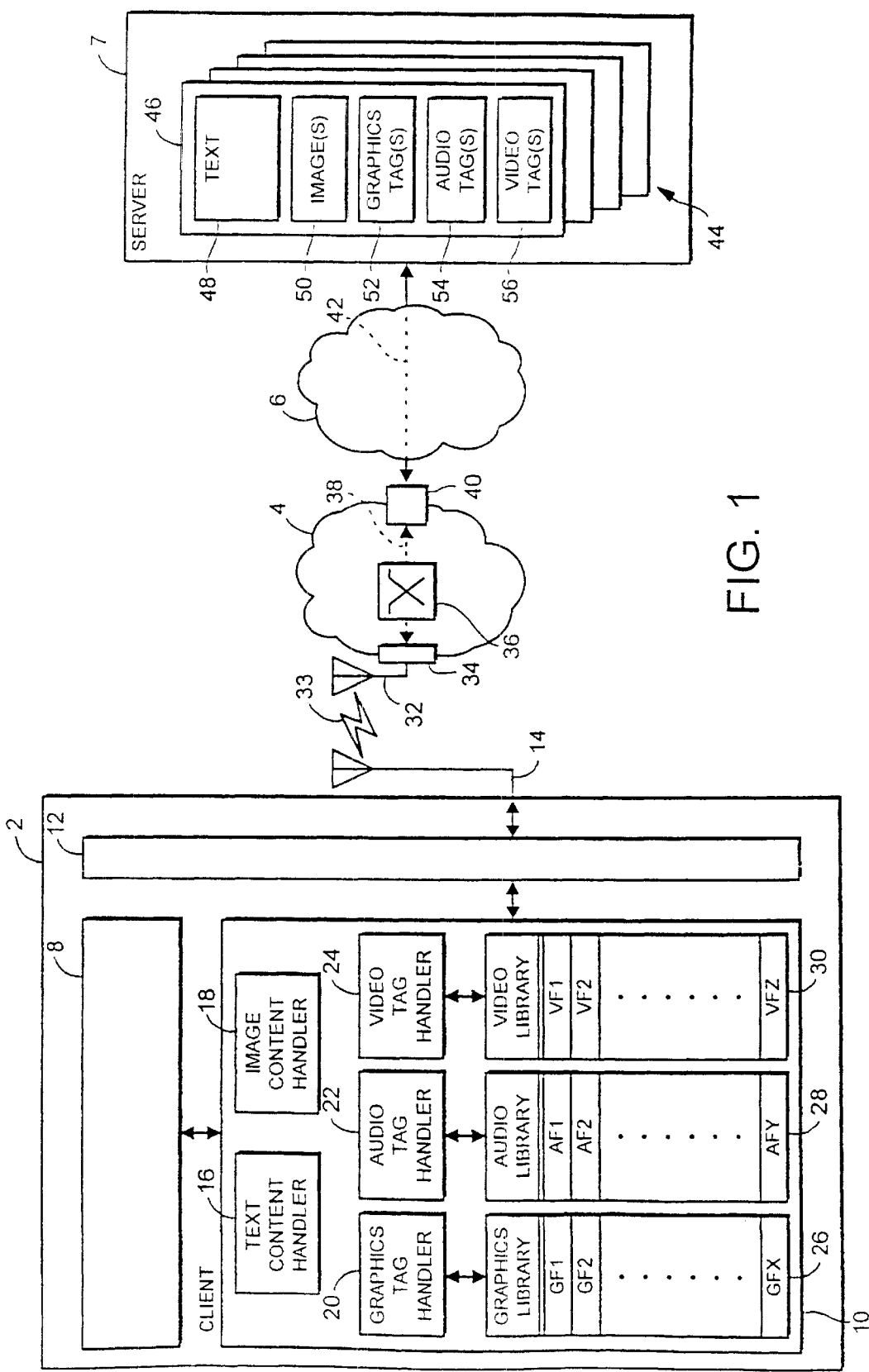
FIG. 1 shows a schematic block diagram illustrating a document retrieval system in accordance with an embodiment of the invention.

Referring to FIG. 1, a multimedia document retrieval system in accordance with an embodiment of the invention includes a mobile client terminal 2 communicating via a mobile communications network 4, such as a GSM digital mobile communications network. and the Internet 6 with the Web server 7.

The mobile client terminal 2 includes a user interface 8, a client application 10, a radio communications front end 12 and a radio transceiving antenna 14.

The user interface 8 includes a keypad, a display screen and a loudspeaker for accepting user input and outputting images and audio signals respectively.

The client application 10 is a customized Web browser, such as a customized version of the Netscape Explorer (Registered Trademark) browser, and includes standard content handlers such as text content handler 16 and an image content handler 18.

In addition, the client application 10 includes as provided in accordance with the present invention, a graphics tag handler 20, an audio tag handler 22 and a video tag handler 24. These content handlers may be components of the browser 10 produced in a development language such as Java, or JavaBeans (Registered Trademark). Associated with each of the tag handlers are a standard graphics library 26, a standard audio library 28 and a standard video library 30, containing content files which are document-independent. The graphics library consists of graphics files GF 1-X. The audio library consists of a number of audio files AF 1-Y, and the video library consists of a number of standard video files VF 1-Z.

The radio communications front end 12 includes amplifiers, frequency selective circuits, etc which are used to perform radio communications via the radio transceiving antenna 14.

The mobile client terminal 2 may be one of various types of terminal, for example a laptop computer provided with radio communications facilities, a personal digital assistant (PDA), or a mobile handset provided with Web browsing capabilities.

Radio signals transmitted and received by the radio transceiving antenna 14 of the mobile client terminal 2 are received and transmitted by a cell site antenna 32 of the mobile communications network 4, via a radio link 33. Only one cell site antenna is illustrated but it will be appreciated that a large number of such antennas are provided in the mobile communications network 4, and the particular serving cell site antenna will depend on the location of the mobile client terminal 2 at any particular time. The cell-site antenna interfaces, via a base station 34, to a mobile switching exchange 36 of the mobile communications network, which maintains a circuit connection 38 with an Internet gateway 40.

The Internet gateway in turn interfaces via the Internet 6 to the Web server 7, using a TCP/IP connection 42.

The server 7 holds a set of Web pages 44, each being referenced by different URLs.

The contents of one such Web page 46 are illustrated in FIG. 1. The Web page 46 contains a textual portion 48, to be handled by the text content handler 16, an image file portion 50, to be handled by the image content handler 18, one or more of a standard predefined set of document-independent graphics tags 52, to be handled by graphics tag handler 20, one or more standard predefined document-independent audio tags 54, to be handled by audio tag handler 22, and one or more of a standard predefined set of document-independent video tags 56. Others of the Web pages 44 also contain text content and the graphics tags, audio tags and video tags used in the illustrated document 46 may be repeated in the remaining Web pages of the set 44 held on the server.

When the client terminal 2 transmits the appropriate URL request to the server 7, via the various data links indicated, the server 7 transmits the Web page back, in HTML format, to the mobile client terminal 2. At the client terminal 2, the various content handlers 16–24 interpret the HTML to present the text and image content 48, 50 of the Web page as indicated by the HTML command therein, and the tag handlers recognize the particular graphics, audio and/or video tags referenced in the document 46, and present the contents of the corresponding file in the libraries 26, 28, 30 as indicated by commands associated with the respective tags.

Figure 2:
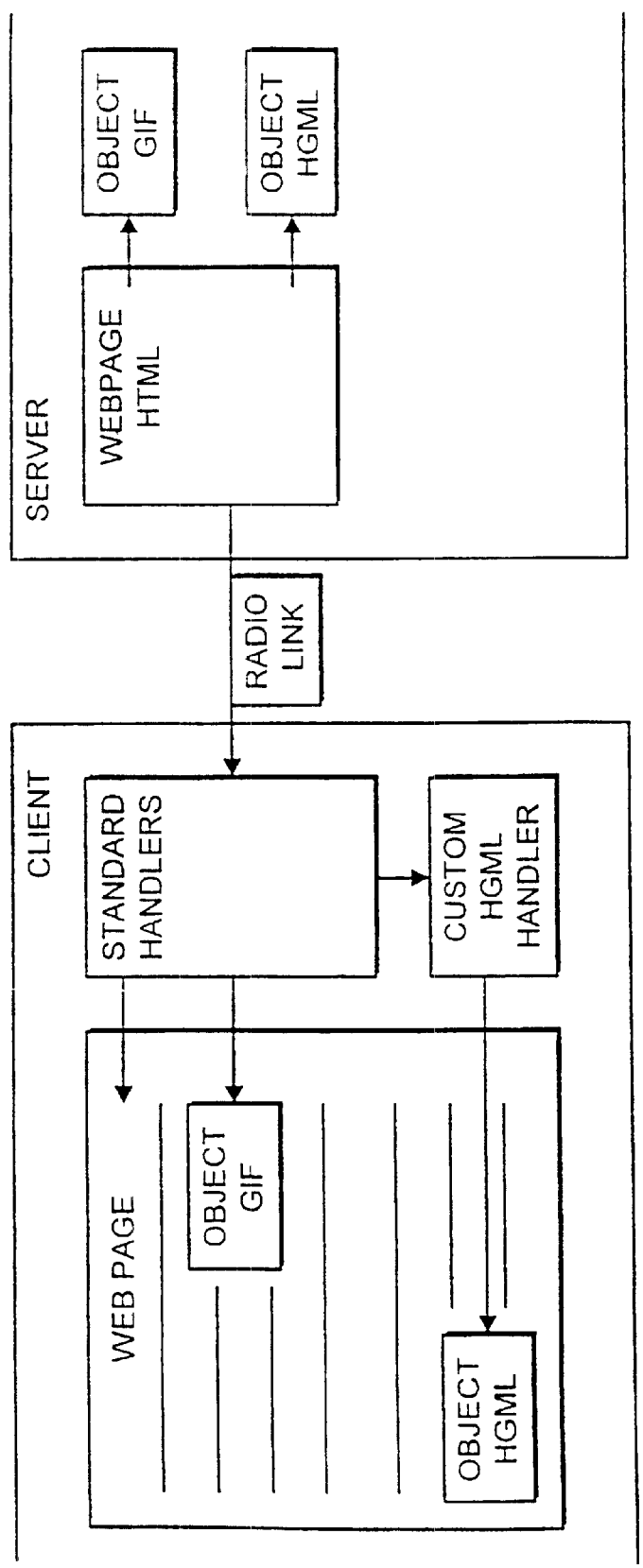
FIG. 2 illustrates a client/server functionality in accordance with an embodiment of the invention.
Figure 3A:
FIG. 3 illustrates a predefined set of document-independent graphics tags and a set of corresponding graphics elements.
Figure 3A:
Figure 3A:
Figure 3A:
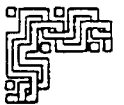
Figure 3A:
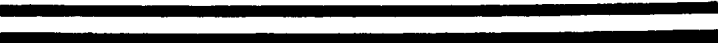
Figure 3A:
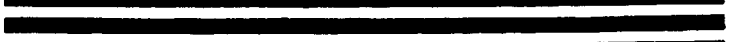
Figure 3A:
Figure 3A:
Figure 3A:
Figure 3A:
Figure 3A:
Figure 3B:
Figure 3B:
Figure 3B:
Figure 3B:
Figure 3B:

FIG. 2 illustrates functionality of a client/server at the content handler level, in accordance with one embodiment of the invention. In this embodiment, three different "markup-languages" are provided for developing Web pages on the server site, and which are interpreted by the tag handlers 20, 22, 24 of the system shown in FIG. 1. These languages are referred to herein as the hyper-graphic mark-up language (HGML), the hyper-speech mark-up language (HSML) and hyper-video mark-up language (HVML).

Designed to extend the power of the Web to mobile communications applications, HGML, HSML and HVML provide for fast communications over narrowband radio channels, such as GSM. while also being functional on higher bandwidth systems.

Through the use of graphical files, audio clips and/or video clips provided on the mobile client terminal in a HGML/HSML/HVML Toolkit, the need for network programming may be significantly reduced, and it is possible to embed tags referencing advanced graphical, speech, video and animation which is stored on the client side into Web pages.

The content handler interprets the HGML/HSML/HVML commands into graphics primitives and calls to access stored graphical images and speech/video files. It is multi-threaded to allow multiple paints onto the page at a given time.

HGML, HSML and/or HVML commands may be embedded in a Web page containing HTML, in which case the client side content handlers process the page and filter out the HGML, HSML and/or HVML commands before resolving them.

References to HGML, HSML and/or HVML resource files may be embedded into Web pages, containing HTML, as markups (e.g. <imgsre-"images/test.hgml">).

Alternatively, HGML/HSML/HVML pages may be hyperlinked as separate resources in Web pages containing HTML (e.g. http://www.test.com/test.hgml).

FIG. 2 illustrates the case in which the HGML/HSML/HVML resources are embedded as markups. FIG. 2 details how content handlers (as exemplified by a HGML content handler) manage content of variable type from a server to display it on a Web page.

The HGML content handler interprets the HGML commands into either graphics primitive or calls to access stored graphical images. There are a number of areas of functionality (which may be defined in object classes) on the client side:

Content handling: The upper object acting as a container for the other required functionalities;

Connection: To handle the network connection to the server and the retrieval of HGML resources from the server;

Command interpreter/Text processing: Takes the HGML resource and processes it into the various graphics requirements (i.e. if more than one picture resides in the resource, etc); and Painting: Takes the commands that make a specific HGML graphic and draw the required graphics to the appropriate place in the browser graphical user interface. Again, this could be primitives or stored images. A Paint object extends a thread class and is managed by the command interpreter, allowing multiple paints to be performed at the same time.

HGML

HGML provides for:

1. Construction of graphics from a standard set of graphics primitives (circles, lines, etc). These are described below.

2. Recall and placement of a standard set of logo/clipart graphics from a client based store. Examples are illustrated in FIGS. 3 and 4.

3. Prevention of download of photo-realistic images.

4. Yielded graphics which act as hyperlinks.

HGML includes various tags or commands, which can be grouped into three functional categories, as shown below.

| Drawing Primitives | Images | Image Manipulation |
|---|---|---|
| ARC | IMAGE | COPY |
| ARROW | THEME | FLIP |
| ELLIPSE | | PASTE |
| LINE | | ROTATE |
| LINETO | | |
| LINEREL | | |
| LINK | | |
| ORIGIN | | |
| POLYGON | | |
| RECTANGLE | | |
| SETSTYLE | | |
| TEXT | | |

Drawing Primitives

The first group of document-independent tags provide HGML with basic drawing functionality, enabling the creation of a range of simple but effective composite images.

Most commands include optional attributes for (out)line color, style, thickness and, when appropriate, fill color. If any of those that are not explicitly specified, the current default settings (as specified by the SETSTYLE tag) are used.

Arc

Draws an arc of a specified width, height and angle from absolute starting coordinates. It has the following attributes:

origin x, y coordinates of arc (absolute) followed by width, height, start angle and arc angle, line color, line style, and line thickness.

e.g. <arc coords="20,20,50,30,45,80",color=red>

Arrow

Draws a line from x1,y1 to x2,y2 using absolute screen (window) coordinates, with an arrow head at the x2,y2 position. It has the following attributes:

start and end x,y coordinates (absolute), line color, line style, and line thickness.

e.g. <arrow coords="10,10,100,100",color=black,psize="2">

Ellipse

Draws an ellipse of a given width and height from the specified coordinates. This tag is also used to draw circles. The following attributes are provided:

center x, y coordinates (absolute) followed by width and height, outline color, fill color, outline style, and outline thickness.

e.g. <ellipse coords="200,200,100,50",color=black,fill=yellow>

Line

Draws a line from x1, y1 to x2, y2, using absolute screen (window) coordinates. The attributes are:

start and end x, y coordinates (absolute), line color, line style, and line thickness.

e.g. <line coords="10,10,100,100",style="dotted",psize="2">

Line to

Draws a line from the current graphics cursor position to a new position (using absolute coordinates). The following attributes are defined:

end of line x, y coordinates (absolute), line color, line style, and line thickness.

e.g. <lineto coords="200,150",color=green>

Linerel

Draws a line relative to the current graphics cursor position using coordinate offsets. The following are its attributes:

end of the line coordinates (relative), line color, line style, and line thickness.

e.g. <linerel coords="15, -10",psize="4">

Link

Allows a rectangular portion of the screen to be defined as an hyperlink. The following attributes are given:

rectangular region x1,y1,x2,y2 (absolute), hyperlink reference.

e.g. <link coords="15,10,50,60", href="http://www.demo.com/demo.hgm">

Origin

Sets the position of the "graphics cursor". For use with LINETO and LINEREL tags. New graphics cursor position x,y is attributed.

e.g. <origin coords="100,130">

Polygon

Draws a polygon using a list of absolute screen coordinates, starting with an origin. Coordinates are listed in the format "x1, y1, x2, x3, y3 . . . xn, yn". The line from the last specified coordinates back to the origin of the shape is drawn automatically to complete the polygon. The following attributes are provided:

origin of shape, followed by n other points (all absolute coordinates), outline color, fill color, outline style, and outline thickness.

e.g. <-six-sided-shape->
<polygon coords="100,100,120,80,140,80,160,100, 140,120,120,120", color=red, fill=red>

Rectangle

Draws a rectangle of a given width and height from the specified coordinates. This tag is also used to draw squares. The following attributes are defined:

top left x, y coordinates (absolute) followed by width and height dimensions, outline color, fill color, outline style, and outline thickness.

e.g. <rectangle coords="10,10,100,15",style="dotted">

Setstyle

Enables default setting for outline color, fill color and outlines style and thickness to be specified. These settings are then used unless explicitly overridden by the attributes in other HGML commands. The attributes are:

outline color, fill color, outline style, outline thickness.

e.g. <setstyle color=red,fill=green>

Text

Displays a text string, starting from the specified coordinates. It has the following attributes:

text position x, y coordinates (absolute), text string to display, and text color.

e.g. <text coords="10,50", text="This is an example of HGML text">

Stored Images

A standard range of pre-drawn images are stored on the mobile client terminal, associated with a standard document-independentset of graphics tags as exemplified in FIG. 3. These images may be used to provide further graphical content to a page, in addition to that which may be achieved using the drawing primitives.

IMAGE

Enables an image to be retrieved from the local repository and displayed at the specified coordinates. The current theme will be used unless another one is explicitly specified. A scaling factor may be specified to dynamically resize the image and a hyperlink can be optionally provided. The attributes are:

image name, theme style, top left coordinates of image, scaling factor (percent), hyperlink reference.

e.g. <image name=ARROW1. coords="50,50", scale=150, href="http://www.demo.com/demo.hgm">

Theme

Enables a new current image theme to be selected. The attributes are:

name of image theme, e.g <theme=DEFAULT>

An example of a set of images which may be associated with an alternative theme ("Theme 2"). As shown, different themes may not have defined images for all of the predefined set of tags—some may not be used in associated with a particular theme. Only a set number of theme styles are provided for.

At a high level, themes are split into three general categories:

Navigation

Images of buttons for a range of relatively standard Web page functions. The structure of this category is strictly defined by HGML such that images are referenced by standard names and relate to the same type of image irrespective. of the theme being used (i.e. HOME, SEARCH, ARROW etc).

Design

A range of standard page design constructs in terms of lines, bullets, separators, etc. The structure of this category is strictly defined by HGML such that images are referenced by standard names and relate to the same type of image irrespective of the theme being used (i.e. LINE1, LINE2, BULLET1 etc).

The navigation and design categories have a prescribed content (i.e. the first element in the Design category is always a line etc). As such, changing the theme associated with a page will mean that, whilst it looks different, the images displayed will still be meaningful and appropriate (e.g. a line will still appear where intended albeit in a different style).

User

User-defined images of which the content is specific to the theme. HGML defines standard names (i.e. USER1, USER2 etc), but these do not provide any indication of the type of image being referenced.

The client side HGML functionality provides at least a default theme. Other themes (defined for example by individual site designers) may be downloaded from a remote server the first time a service that uses them is accessed. Alternatively, a user may have a personal preferred theme which may be provided on the client terminal and used in preference to the default and/or downloaded theme.

User-defined theme elements are provided to permit a degree of flexibility to Web site developers, whilst still remaining optimization advantages.

This group allows local storage of other images, outside the standard categories prescribed. These may be used to reference any images that the site/theme designer wishes. It is anticipated that this will include images relating to corporate identity (e.g. logos etc) to further standardize the look and feel of their pages. They could, however, also include additional line and bullet styles etc that could not be encompassed under the standard headers provided.

The number of user-defined images is limited to a predetermined number (e.g. ten) in order to prevent the image repository from becoming undesirably large.

All images not included in the standard theme may need to be downloaded each time a site is accessed (although they may be cached from a previous session). At such, it is intended that user-defined slots are utilized to hold the largest and most used images (thus helping to further optimize download times).

Whilst user-defined images are envisaged primarily as site-specific, however other designers may wish to reuse them in their own sites. In this case, there are two alternatives:

(1) to incorporate the required images into the user-defined slots of the site's own theme; or (2) to make the site reliant on two or more themes (i.e. a default. along with the one(s) containing the images to be reused). In this case, the end-user obtains all of the necessary themes before being able to access the site. The site provider would provide download access for each theme.

Image Manipulation

HGML supports the manipulation of the onscreen bitmap image using COPY, PASTE, FLIP and ROTATE commands.

These are intended to further optimize the creation of certain types of image. For example, rather than store four Arrow symbols (pointing left, right, up and down), a single image may be stored in the database and then ROTATEd and FLIPed as desired.

The functions also help to optimise the storage of theme images. For example, rather than store four Arrow symbols (pointing left, right, up and down), a single image may be stored in the database and then ROTATEd and FLIPed as desired.

Copy

Copies of specified rectangular screen segment to a memory buffer. The original image remains unchanged. The attributes are:

top left and bottom right coordinates of segment.

e.g. <copy coords="50,50,100,100">

Flip

Performs a horizontal or vertical flip of a screen defined by the specified coordinates. The attributes are:

top left and bottom right coordinates of segment. and horizontal or vertical flip.

e.g. <flip coords="50,50,100,100",axis="horiz">

Paste

Copies of the contents of a memory buffer to an appropriately sized rectangular screen segment, starting at the specified coordinates. The attributes are:

top left coordinates to paste segment.

e.g. <paste coords="100,100">

Rotate

Performs a rotation of a circular screen area by a specified angle. The attributes are:

coordinates of center, radius and rotation angle.

e.g. <rotate coords="50,50,30 ",angle="80">

HSML

Figures 4B, 5:
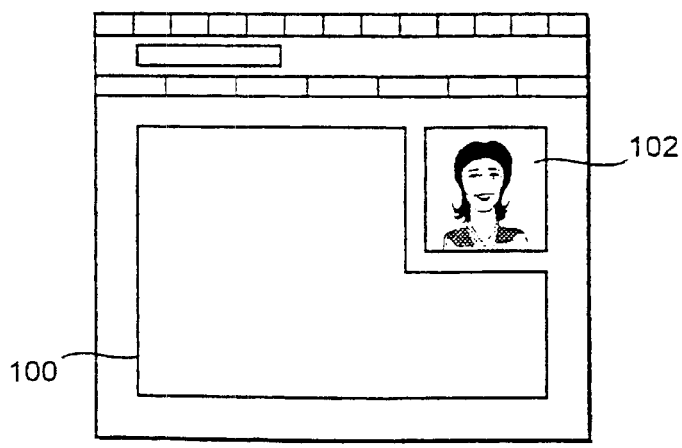
FIG. 5 illustrates a screen display provided in accordance with an embodiment of the invention.

FIG. 5 illustrates a screen display on the mobile client terminal 2 when displaying a Web page containing HSML.

As illustrated, the browser displays the text content, formatted as specified by the HTML markups in the Web page, and a speech agent image portion 102, which is driven in accordance with the HSML markups contained or referenced in the downloaded Web page in association with the replay of locally-stored audio clips referenced by audio tags contained in the Web page, or the generation of speech by conversion from text contained in the Web page.

The speech agent interface provided by the mobile client terminal is controlled by a speech playback/generator/ program application and a moving image application program stored on the mobile terminal.

The speech agent has a variety of selectable vocal and facial styles. The various selectable vocal styles are defined in vocal style files stored on the mobile client terminal, containing data describing algorithms and settings for manipulating the audio data providing the speech function to alter the vocal characteristics. The facial style selections are defined in facial style files stored on the mobile client terminal. The facial style files include data defining a plurality of selectable base facial images, a plurality of selectable mouth images, a plurality of image animation algorithms (e.g. talk, smile, wink, etc.) corresponding with the base facial images and the mouth images, and a plurality of image rendering algorithms for rendering the facial style in accordance with selected characteristics of the face, such as skin colour, hair colour, etc. The vocal and facial style files may be stored permanently on the mobile terminal and/or stored in non-volatile memory on the mobile terminal after being downloaded from an Internet server.

The speech agent function provided in the mobile client terminal is provided with predefined default settings, in which the vocal and facial style characteristics are preset without input from the user. These characteristics include voice gender, accent, language, base facial style, skin color, hair color, eye color, mouth size, etc. The user may however override the default vocal and facial style characteristics settings, by resetting one or more of the characteristics via menu options on a man-machine interface of the mobile terminal, in order to provide a personalized default speech agent. The default speech agent settings, whether predefined or user-defined, are used unless an alternative agent theme is specified by mark-ups contained in a Web page, as described below. If an alternative agent theme is specified, the vocal style and the facial style of the speech agent is altered only for the duration of the display of the Web page in question, after which time the default speech agent is reverted to.

| Audio Playback | Agent Style | Agent Control |
|---|---|---|
| SAY | AGENT THEME | ACTION |

Say

This markup causes an audio file to be retrieved from, or generated using data retrieved from, the local repository and "spoken" by a speech agent. The default speech agent theme, defining the vocal and facial styles of the speech agent, will be used unless another one is explicitly specified. The attribute required is a phrase name:

e.g. <say phrase="GREETING!">

"GREETING!" may be a tag to an audio file held in the audio graphics library 28, or may be replayed using a text-to-speech translator on the client side.

Agent Theme

This markup causes the vocal and facial style combination for the speech agent to be altered from the default. Voice style attributes may be used in order to incorporate different genders, accents and/or languages into the playback. Face style attributes allow different appearances to be selected for the speech agent. The combination of attributes may be used to create agents with different personalities. The attributes which may be included are:

Voice gender, accent language, base facial style, skin color, hair color, eye color, mouth size, etc.

e.g. <agent theme=female3,English,English,female5, pale,black, brown,medium>

Action

This markup controls the image of the speech agent, determining whether it is to be displayed and any movements to be made in conjunction with audio playback. The attributes are an action for the agent (possible actions: appear, talk, smile, wink, etc.) and an action activation status (on/off).

e.g. <action=talk,on>

The action markups are referenced by a moving image handler to produce and control the image of the speech agent. When the appear action is activated, the speech agent appears at a specified part of the screen display. When deactivated, the speech agent does not appear. When the talk action is activated, the moving image handler animates the mouth of the speech agent in conjunction with any speech being generated by the SAY command. Other actions (e.g. smile, wink) are also suitably animated when activated.

HVML

HVML supports a single tag, namely PLAYBACK, which has a file reference attribute. When parsing Web page, the HVML tag is interpreted by the video, tag handler, which retrieves a video file from the standard video file library 30 which corresponds with the reference contained in the command.

It will be appreciated that the HGML, HSML and HVML functionality illustrated above are provided for exemplary purposes, and are not intended to be limiting. It will be appreciated that various modifications and variations may be employed without departing from the scope of the present invention.

What is claimed is:

1. A mobile handset for use in a mobile communications system, said handset comprising:

a user interface;

a radio communications front end;

a radio transceiving antenna;

means for interpreting a multimedia document received from a remote server, said interpreting means comprising:

means for recognizing textual presentation markup tags in a said document and presenting text to a user in accordance with said markup tags;

means for recognizing a standard set of document-independent local library file markup tags in a said document;

means for storing a standard set of non-textual local library files corresponding to said local library file markup tags; and means for presenting content provided by one of said local library files via said user interface in response to the recognition of one of said local library file markup tags in a said document.

2. A mobile handset according to claim 1, wherein said non-textual files comprise graphics files.

3. A mobile handset according to claim 2, wherein said graphics files define images of buttons used for document navigation purposes.

4. A mobile handset according to claim 3, wherein said images comprise at least one of a home button, a search button and an arrow button.

5. A mobile handset according to claim 3, wherein said interpreting means is capable of recognizing a hyperlink reference associated with a said image tag within a markup in said document.

6. A mobile handset according to claim 2, wherein said graphics files define images of standard page design constructs.

7. A mobile handset according to claim 6, wherein said standard page design constructs comprise at least one of a line image, a bullet image and a separator image.

8. A mobile handset according to claim 3, wherein said images are grouped into a plurality of themes, and said interpreting means is for recognizing a theme selection markup tag and selecting between said image files in dependence on a recognized theme selection markup tag.

9. A mobile handset according to claim 1, wherein said non-textual files comprise at least one of audio files and video files.

10. A mobile handset according to claim 1, wherein said non-textual files comprise data for speech synthesis, and said tags define speech to be synthesized.

11. A mobile handset according to claim 10, wherein said non-textual files comprise data defining a facial image and data for animation of said facial image, said handset comprising means for presenting said speech in conjunction with a graphical display of an animation of said facial image.

12. A mobile handset according to claim 11, wherein said local library file markup tags include a plurality of predetermined animation tags which are recognized by said interpreting means to provide a plurality of animations of said facial image.

13. A mobile handset according to claim 12, wherein said plurality of animations comprise at least one of a talk animation, a smile animation and a wink animation.

14. A mobile handset according to claim 11, wherein characteristics of said moving facial image are selectable by a user of the mobile handset.

15. A mobile handset according to claim 1, wherein said interpreting means comprises means for recognizing two dimensional graphics markup tags in said document and for rendering a graphical object on said user interface on the basis of a plurality of said graphics markup tags.

16. A mobile handset according to claim 15, wherein said graphics markup tags comprise at least one of line drawing commands and image manipulation commands.

17. A mobile handset according to claim 1, for use in a cellular communications system.

18. A mobile handset according to claim 17, wherein said cellular communication system is a GSM communications system.

19. A mobile handset for use in a mobile communications system, said handset comprising:
- a user interface;
- a radio communications front end;
- a radio transceiving antenna; and
- a browser application to interpret a multimedia document received from a remote server, said browser application configured:
  - to recognize textual presentation markup tags in said document and presenting text to a user in accordance with said markup tags;
  - to recognize a standard set of document-independent local library file markup tags in said document;
  - to store a standard set of non-textual local library files corresponding to said local library file markup tags; and
  - to present content provided by one of said local library files via said user interface in response to the recognition of one of said local library file markup tags in said document.

20. A mobile handset according to claim 19, wherein said non-textual files comprise graphics files.

21. A mobile handset according to claim 20, wherein said graphics files define images of buttons used for document navigation purposes.

22. A mobile handset according to claim 21, wherein said browser application is capable of recognizing a hyperlink reference associated with an image tag within a markup in said document.

23. A mobile handset according to claim 21, wherein said images are grouped into a plurality of themes, and said browser application recognizing a theme selection markup tag and selecting between said image files in dependence on a recognized theme selection markup tag.

24. A mobile handset according to claim 19, wherein said browser application is configured to recognize two dimensional graphics markup tags in said document and to render a graphical object on said user interface on the basis of a plurality of said graphics markup tags.

25. A method for interpreting a multimedia document from a remote server received by a mobile handset in a mobile communications system, comprising:
- recognizing a textual presentation markup tag in the multimedia document;
- presenting text to a user in accordance with said markup tag;
- recognizing a standard set of document-independent local library file markup tags in said document;
- storing a standard set of non-textual local library files corresponding to the local library file markup tags; and
- presenting content provided by one of the local library files via the user interface in response to the recognition of one of the local library file markup tags in a the document.

26. The method of claim 25, further comprising recognizing two dimensional graphics markup tags in the document; and rendering a graphical object on the user interface on the basis of a plurality of the graphics markup tags.

27. The method of claim 26, wherein said graphics markup tags comprise at least one of line drawing commands and image manipulation commands.

* * * * *